Patented Apr. 1, 1941

2,236,517

UNITED STATES PATENT OFFICE 2,236,517

COMPOSITION OF MATTER

Frank J. Cahn and Benjamin R. Harris, Chicago, Ill., assignors to The Emulsol Corporation, Chicago, Ill., a corporation of Illinois No Drawing. Application April 13, 1939,
Serial No. 267,717

23 Claims. (Cl. 99—11)

This invention relates to the preparation of materials which are dispersible or emulsifiable in aqueous media as well as to the preparation of dispersions or emulsions of oleaginous or similar materials in aqueous media and is particularly concerned with essential oil preparations, fat-soluble vitamin preparations, and other food and medicinal preparations such as those containing corpus luteum and the like, which are administered orally, subcutaneously, intravenously, intramuscularly or intraperitoneally.

Essential oils sch as lemon oil, orange oil and the like are used in the arts in the preparation of divers kinds of products such as candies and confections, beverages, cosmetic creams, hair shampoos, and in various other edible preparations as well as cosmetic and medicinal compositions. In general, the proportion of essential oil in the ultimate preparation in which it is employed is quite small, usually being of the order of less than 1%. Since the essential oils are immiscible with water, it has been customary to utilize them in conjunction with gums such as gum tragacanth and the like in order to render them dispersible with or emulsifiable in aqueous media. Such practice has various objections among which may be mentioned the difficulty of obtaining satisfactory or adequately uniform dispersions, and the tendency of prepared mixtures of the gums and essential oils to undergo deterioration or spoilage in storage and/or shipment.

In the art dealing with the administration of fat-soluble vitamins, notably vitamins A and D, important problems have arisen which, up to the present time, have not been fully satisfactorily solved. In their usual form, vitamin A and D preparations are of oleaginous character and their general distastefulness has introduced problems, particularly in connection with oral administration thereof to infants and children. Numerous attempts have been made to overcome these known objections by incorporating such vitamin concentrates into bread, ice cream, candy, margarine, butter, cheese, peanut butter, salad dressings, cereals, and other food products.

Following this same general approach, it has been proposed to incorporate vitamin A and D concentrates into aqueous materials such as water, milk, soups, sirups, fruit juices and the like. Since these vitamins are fat-soluble and water-insoluble, much difficulty has been encountered in effecting a uniform distribution thereof in aqueous media and maintaining the necessary homogeneity in order to assure proper dosage. Various means have been utilized in an effort to cope with this problem and it has been suggested, among other things, to homogenize or colloidize the mixture of fat-soluble vitamins and aqueous material. None of the suggested means of solving this problem has met with any full measure of success.

In recent years, vitamin A and D preparations have been marketed with some success wherein the vitamins are dissolved in certain glycols to render them water-miscible. These preparations may be dispersed or distributed in water or aqueous materials to obtain reasonably uniform or homogeneous colloidal or similar dispersions. However, there are certain objections to such compositions which the present invention overcomes. Disregarding the question of the innocuousness to the human system of the glycols which are employed as solvent media for the vitamins A and D, there are certain very definite limitations upon the degree to which such vitamin solutions can be dispersed or distributed in water or other aqueous media. Beyond a certain point, depending upon the particular glycol employed, the further dilution with aqueous materials causes a flocculation or cloudiness with a concurrent loss of the desired uniformity and homogeneity which make for proper dosage requirements.

The same or analogous problems arise in connection with the preparation of icings and candies including fudges, toffees and the like where proper distribution of oleaginous materials is frequently a desideratum. Again, reference may be made to gelatin dessert powders, to prepared flour compositions, to the manufacture of sausages and meat pastes which contain a significant content of moisture, to the preparation of soya bean milk, to the preparation of milk enriched with coconut oil or other oils and fats, and to the dispersion of oil-soluble colors or dyes in aqueous media. Similar problems arise in connection with the dispersion of vitamins on solid surfaces such as cereals and breakfast foods where a very small amount of active ingredient, which is difficultly soluble or insoluble in aqueous media, is desired to be dispersed on large surfaces. In all of these and other cases, where a problem of dispersing or emulsifying a solid or a liquid is concerned, particularly where the material to be dispersed is of oleaginous character, the present invention is of importance. The improvemens brought about by the teachings herein are particularly applicable to the fields of human foods and medicines as well as foods and medicines for domesticated or other animals and the like including, for example, dog foods, poultry feed, fish food, cattle feed, and the like.

In accordance with the present invention, many of the difficulties heretofore encountered in the preparation of products of the character previously mentioned are in large measure obviated. It has been found, for example, that the incorporation of certain chemical compounds, hereinafter more particularly described, with provitamins or fat-soluble vitamins, particularly in the form of concentrates thereof as well as irradiated ergosterol and solutions thereof, brings about entirely unexpected results.

Many of the chemical compounds disclosed herein also enable the provitamin and fat-soluble vitamin preparations to be dispersed or distributed into aqueous material to provide a fine, uniform, homogeneous suspension or colloidal dispersion which may be diluted with water or other aqueous materials without disturbing the stability or homogeneity of the product. Many of the compounds disclosed herein, such as, for example, the reaction product of mono-olein with the di-acetic acid ester of tartaric acid anhydride, do not curdle but retain their desired properties even when extensively diluted with water or aqueous material after initial dispersion.

In general, the compounds and reaction products which are employed for the purposes of and in accordance with the present invention are most suitably prepared by reacting a lower molecular weight carboxylic acid ester of an anhydride of an hydroxypolycarboxylic acid with an alcohol containing at least four carbon atoms and preferably from eight to eighteen carbon atoms. By way of illustration, this may be exemplified by reacting the acetic acid ester of citric acid anhydride with lauryl alcohol.

While many of the reaction products utilized in accordance with the present invention may best be defined in the form of reaction products, they and particularly some of the more potent constituents thereof can, at least in part, be characterized or described by way of structural formulae. Illustrative examples of such compounds whose use herein falls within the scope of the invention are as follows:

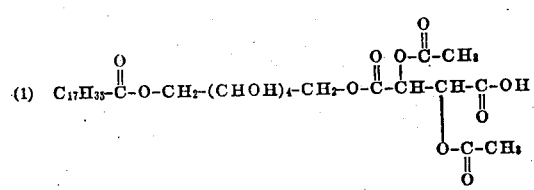

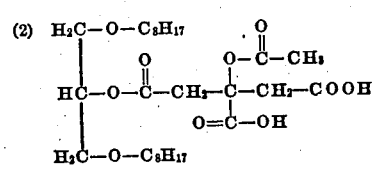

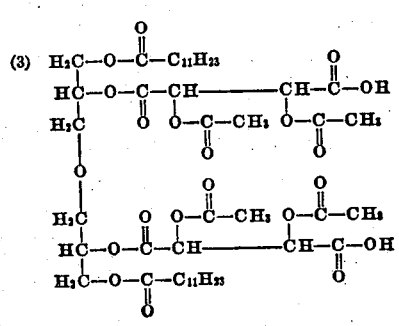

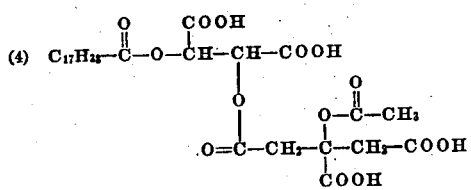

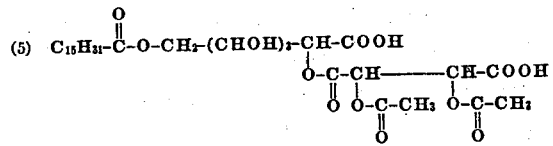

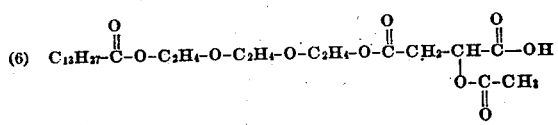

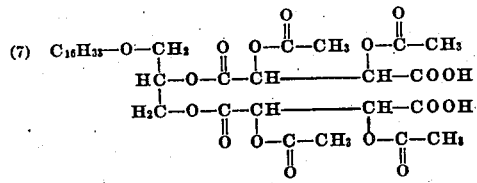

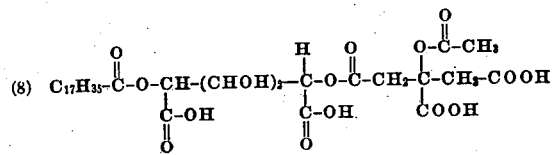

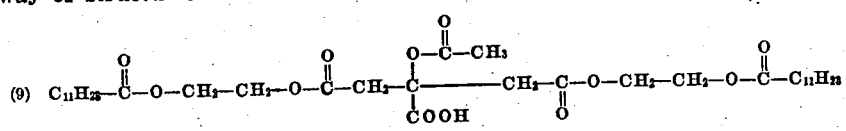

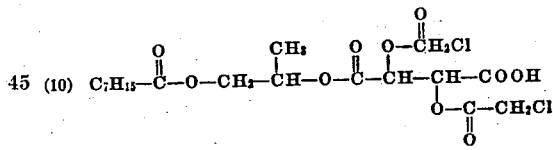

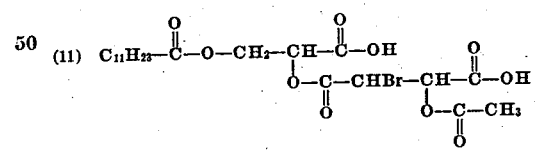

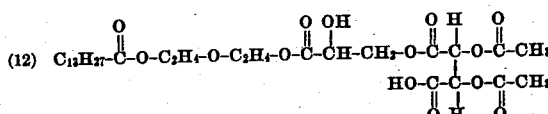

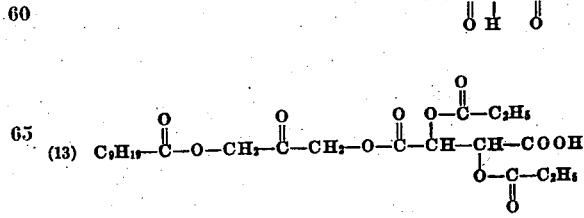

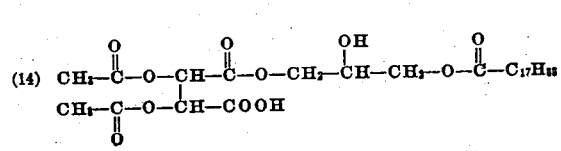

(15) 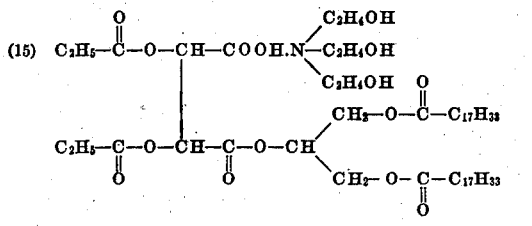

(16) 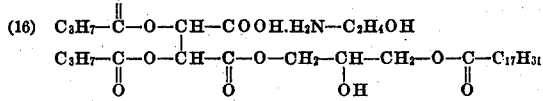

(17) 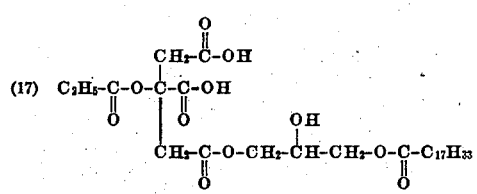

(18) 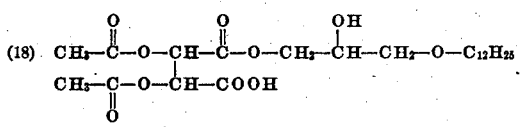

(19) 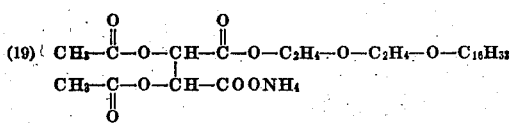

(20) 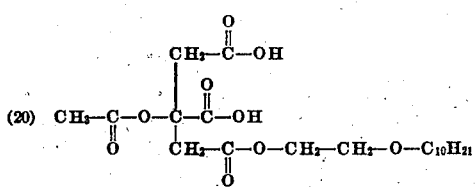

In order that the full significance of the invention may be made even more apparent, the following illustrative examples for the preparation of the chemical compounds or reaction products are set forth. It will be appreciated that the proportions of reacting ingredients, times of reaction, temperatures of reaction, and the like may be varied and that supplementary processes of purification and the like may be resorted to wherever found desirable or convenient. These and other variations and modifications will be evident to those skilled in the art in the light of the guiding principles which are disclosed herein.

Example A 3.72 parts by weight of commercial lauryl alcohol and 4.32 parts by weight of the acetic acid ester of citric acid anhydride were heated to 100 degrees C. with stirring until practically all of said anhydride went into solution. The resulting reaction product contained at least a substantial amount of a compound of the probable formula

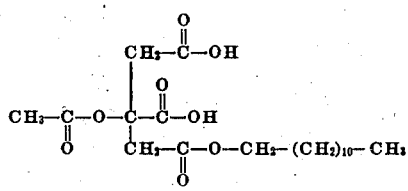

Example B 12.65 parts by weight of di-acetic acid ester of tartaric acid anhydride and 10.6 parts by weight of commercial lauryl alcohol were heated to 100 degrees C. with stirring. After several minutes at this temperature, the anhydride went into solution. The resulting reaction product contained at least a substantial amount of a compound of the probable formula

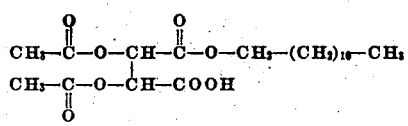

The product is a substantially odorless transparent syrup with a faintly bitter taste. On heating at 110 degrees C. for 1 hour, the bitter taste was eliminated.

Example C 10.05 parts by weight of di-acetic acid ester of tartaric acid anhydride and 12.5 parts by weight of monolaurin (containing 0.2% free fatty acid) were heated at 100 degrees C. with stirring, about 10 minutes being required for a homogeneous solution to form. The resulting product, having at least a substantial amount of a compound of the probable formula

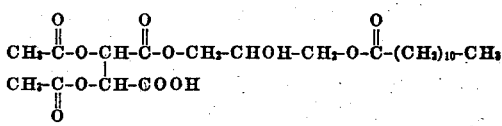

was a transparent syrup the viscosity of which increased on prolonged heating.

In place of di-acetic acid ester of tartaric acid anhydride, the acetic acid ester of citric acid anhydride may be employed. Furthermore, instead of monolaurin, the monolauric acid ester of diethylene glycol may be used. These and other substitutions are disclosed in detail hereinafter and apply to the present example as well as the other examples.

Example D 25.55 parts by weight of a product comprising mainly the monolauric acid ester of diglycerol were reacted at 150 degrees C. with stirring for several minutes with 16.0 parts by weight of distilled di-acetic acid ester of tartaric acid anhydride. The resulting reaction product comprised a substance with the following probable formula:

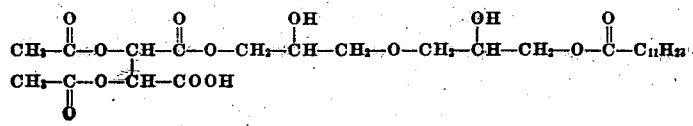

The above reaction was also carried out with equal parts by weight of monocaprylin and di-acetic acid ester of tartaric acid anhydride. A product resulted having properties generally similar to those of Example C.

Example E 9.5 parts by weight of propylene glycol monolaurate and 7.8 parts by weight of distilled di-acetic acid ester of tartaric acid anhydride were heated at 140 degrees C. with stirring for approximately 15 minutes. The reaction product contained at least a substantial amount of a chemical compound having the following probable formula:

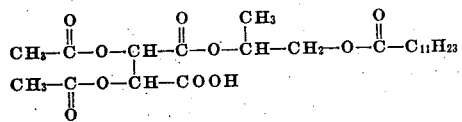

Example F 7.85 parts by weight of ethylene glycol monolaurate and 7.0 parts by weight of di-acetic acid ester of tartaric acid anhydride were heated at 150 degrees C. with stirring for approximately 5 minutes. The resulting reaction product was then neutralized with dilute caustic soda solution. It contained at least a substantial amount of a compound having the probable following formula:

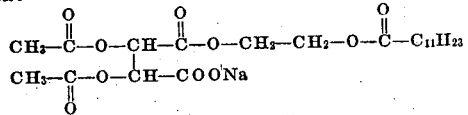

Example G 5.65 parts by weight of normal octyl alcohol and 9.5 parts by weight di-acetic acid ester of tartaric acid anhydride were heated at 150 degrees C. with stirring for approximately 5 minutes and then the reaction product was neutralized with caustic soda. The reaction product contained a substantial amount of a product having the following probable formula:

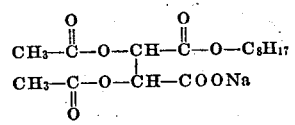

Example H 13.45 parts by weight of castor oil and 9.2 parts by weight of di-acetic acid ester of tartaric acid anhydride were heated at 160 degrees C. with stirring for several minutes. The product was then neutralized with caustic soda. It was water-soluble.

Example I 6.65 parts by weight of monostearin and 8.0 parts by weight of di-acetic acid ester of tartaric acid anhydride were heated at 160 degrees C. with stirring for several minutes.

Example J 319 parts by weight of di-olein and 130 parts by weight of di-acetic acid ester of tartaric acid anhydride where heated at 170 degrees C. with agitation by means of a stream of carbon dioxide gas for 10 minutes.

Example K 237 parts by weight of a product consisting substantially of mono-olein and 144 parts by weight of di-acetic acid ester of tartaric acid anhydride were heated slowly up to 150 degrees C. while passing a stream of carbon dioxide gas therethrough and the reaction mass was kept at such temperature for about 5 minutes. The reaction product was a pale yellow viscous syrup.

Example L 389 parts by weight of the mono-cetyl ether of diglycerol and 216 parts by weight of di-acetic acid ester of tartaric acid anhydride were heated with stirring at 155 degrees C. for 10 minutes.

Instead of reacting the anhydride of acetic acid esters of citric and tartaric acids and the like with alcohols, it is also possible to react said anhydrides with amines and amides such as hexyl amine, octyl amine, lauryl amine, stearyl amine, lauramide, stearamide, and the like to produce new and useful products for the purposes of the present invention. An example of such procedure comprises heating 7.8 parts by weight of commercial n-1 laurylamine with 10 parts by weight of distilled di-acetic acid ester of tartaric acid anhydride at 140 degrees C. for several minutes. The resulting reaction product, a brown syrup, when neutralized to phenolphthalein with caustic soda comprises

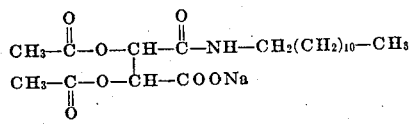

The reaction products of the present invention may be reacted with various alcohols such as butyl alcohol, octyl alcohol, lauryl alcohol, cetyl alcohol, oleyl alcohol, stearyl alcohol, as well as derivatives of polyhydroxy substances such as monostearin, monolaurin, mono-olein, di-laurin, di-olein, mono-cetyl ether of glycerol, diethylene glycol mono-oleate, diethylene glycol mono-laurate, and other alcohols such as those described hereinafter to produce reaction products having valuable properties for the present purposes. The reaction in such cases appears to be one of esterification between free carboxyl groups of the products hereinabove described and hydroxy groups of the alcohols. If desired, the free carboxyl groups may be converted to acyl halides and then reacted with the alcohols. The reaction may be accelerated by the use of the usual condensing agents such as sulphuric acid, chlorsulphonic acid, and the like. Such reactions may also be carried out between the products of the present invention, as described in the various examples listed hereinabove, and the products described in the application of Benjamin R. Harris, Serial No. 243,099, filed November 30, 1938. Particularly valuable products result from the interaction between the products of the present invention, as described in the various examples listed hereinabove, and such compounds as the mono-tartaric acid ester of glycerin, the mono-citric acid esters of ethylene glycol and diethylene glycol, the ester resulting from one mol of tartaric acid and two mols of glycerin and, in general, the water-soluble and water-dispersible esters of aliphatic polyhydroxy substances with polycarboxylic and hydroxypolycarboxylic acids. Such esters are disclosed as intermediate products in the preparation of the compounds disclosed in the aforementioned application of Benjamin R. Harris.

The hydroxy polycarboxylic acid anhydrides whose acetic acid esters and similar derivatives are reacted with alcohols, amides, amines, and the like, to produce products for use in accordance with the present invention may be selected from a large group including, for example, citric acid, tartaric acid, malic acid, hydroxy methyl-succinic acid, trihydroxyglutaric acid, mucic acid, saccharic acid, and the mono- and poly-hydroxy derivatives of adipic acid, pimelic acid, suberic acid, azelaic acid, sebacic acid, and the like. It is preferred to employ the acetic acid esters or like derivative of the anhydrides of those hydroxy polycarboxylic acids which are water-soluble and of aliphatic character. These acids may contain other substituents such as $NH_2$, F, Cl, Br, I, etc. Of particular importance are citric and tartaric acids.

In place of the acetic acid ester derivatives of the anhydrides of the hydroxy polycarboxylic acids, I may employ any carboxylic acid derivative, preferably water-soluble and of aliphatic or fatty character and particularly containing not more than six carbon atoms although the invention is not so limited. Examples of such derivatives are those from propionic acid, butyric acid, valeric acid, maleic acid, succinic acid, and the like. Of particular utility, however, are the acetic acid ester derivatives.

The alcohols which are reacted with the acetic acid esters of the hydroxy polycarboxylic acid anhydrides may be selected from a large group including aliphatic straight chain and branched chain alcohols such as butyl alcohol, amyl alcohol, hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, high molecular weight glycols such as cetene glycol and other vicinal glycols; 1,10 dihydroxyoctadecene, 1,10 dihydroxyoctadecane, and the like; branched chain octyl, decyl, dodecyl, tetradecyl, hexadecyl and octadecyl aliphatic alcohols as, for example, 2-ethyl hexanol-1, 2-n butyl octanol-1, 2-butyl tetra-decanol-1, and, in general, the higher molecular weight saturated and unsaturated aliphatic straight chain and branched chain alcohols. Preferably, the alcohols which are utilized are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. Other alcohols which may be employed are the cycloaliphatic or ali-cyclic alcohols such as the sterols, as, for example, cholesterol, iso-cholesterol, phytosterol, sitosterol, hydroaromatic alcohols such as abietol, and such unsaturated alcohols as linalool, citronellol, geraniol and the like and hydrogenated products of the foregoing. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, l-hydroxy-stearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like. Still other alcohol molecules are the carboxylic acid amides of alkylolamines such as lauric acid amide of mono-ethanolamine, oleic acid amide of mono-propanolamine, and the like.

The term "alcohols," as employed herein, is intended to include alcohols which may or may not contain other groups such as carboxylic, carbonyl, halogen, or other radicals.

The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which compounds useful for the purposes of the present invention may be produced. As examples of such alcohols may be mentioned partially esterified or partially etherified mono-, di-, and poly-saccharides, and sugar alcohols such as monolauric acid ester of sucrose, monostearic acid ester of dextrose, mono-palmitic acid ester of sorbitol, monolauryl ether of pentaerythritol, monolauric acid ester of pentaerythritol, and the like; the monoglycerides and di-glycerides, preferably of the higher fatty acids, including, for example, monoacetin, dibutyrin, monolaurin, monomyristin, monostearin, mono-olein, distearin, diolein, dicaproin, mono-lauryl ether of glycerol, mono-oleyl ether of glycerol, mono-cetyl ether of glycerol, di-cetyl ether of glycerol, monostearyl ether of glycerol, mono-stearic acid ester of diethylene glycol, monolauric acid ester of ethylene glycol, monolauric acid ester of triethanolamine, monostearic acid ester of tripropanolamine, and the like. The aliphatic polyhydroxy substance which is partially esterified or etherified to provide one of the reacting constituents herein may be selected from a large class and includes, among those mentioned, glycerol; glycols such as ethylene glycol, propylene glycol, trimethylene glycol, butylene glycol and the like; polyglycols such as diethylene glycol; pentaerythritol; quercitol; dihydroxy acetone; triethanolamine; tripropanolamine; polyglycerols such as diglycerol, triglycerol, tetraglycerol and the like including mixtures thereof; carbohydrates and sugars including mono, di- and polysaccharides, such as dextrose, sucrose, xylose, arabinose, galactose, fructose, maltose, mannose, dextrin, starch, and the like; the natural and synthetic, simple and complex gucosides; sugar alcohols such as arabitol, mannitol, sorbitol and dulcitol; and polyhydroxy-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as, for example:

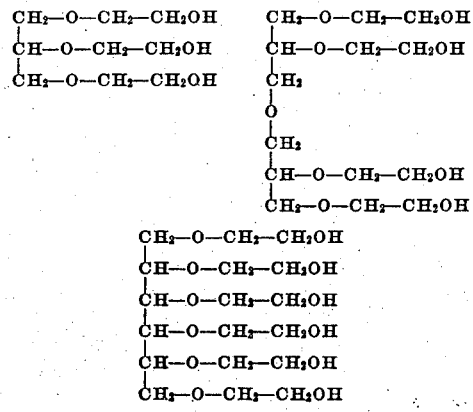

(For convenience, all hydroxyl groups are written facing one way). In general, this type of alcohol may be represented by the formula $$(RO)_v-X-(OH)_w$$

wherein R is a radical selected from the group consisting of alkyl, cyclo-alkyl, aryl, aralkyl, and acyl, and substitution products thereof, X is the residue of the aliphatic polyhydroxy substance, and $v$ and $w$ are small whole numbers.

It is, of course, obvious that the alcohols from which the compounds disclosed herein may be produced may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols or their derivatives may be utilized in the preparation of the compounds as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$. Again, mixtures of alcohols such as are present in the so-called sperm oil alcohols, as well as those present in wool-fat, may efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the products may be prepared from a single, substantially pure alcohol.

The reaction products may be used as such or they may be neutralized, in whole or in part, with suitable anti-acid materials. In this connection, considerable latitude and modification may be exercised. In general, inorganic as well as organic anti-acid agents may be employed. Examples of such agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, calcium and magnesium oxides, hydroxides, and salts, potassium stearate, sodium stearate, and the like.

It will be understood that by the term "cation", as used throughout the specification and claims, is meant hydrogen and such other elements as are mentioned herein, and, in general, atoms or radicals which are regarded as bearing a positive charge or capable of replacing acidic hydrogen. The reaction products may be neutralized to methyl orange, litmus or phenolphthalein or to any desired hydrogen ion concentration. As a general rule, if the salts of the reaction products are employed, it is preferred to use the sodium, potassium, ammonium, or other soluble salts.

It will be seen, from a consideration of the numerous examples listed hereinabove, that the chemical compounds fall into two distinct categories, namely, (1) those wherein the acetic acid esters of tartaric acid anhydride or the like are reacted with simple alcohols such as the monohydric alcohols like octyl alcohol, lauryl alcohol, oleyl alcohol and the like, and (2) those wherein the acetic acid esters of tartaric acid anhydride or the like are reacted with complex alcohols such as derivatives, of polyhydroxy substances, like monostearin, monoolein, di-olein, mono-cetyl ether of glycerol, mono-cetyl ether of diglycerol, and the like. The compounds falling into this last-mentioned category are particularly satisfactory and their use constitutes an especially important phase of the present invention.

It will be understood that the compounds need not be utilized in the pure state. Indeed, in most instances it will be found to be more convenient and commercially desirable to employ them in the form of their reaction mixtures with or without the addition of diluents. It will also be understood that mixtures of any one or more of the reacting constituents may be employed in producing the products hereof and this is particularly the case where commercial supplies of the chemicals are utilized; and, in addition, any of the esters of the hydroxy polycarboxylic acid anhydrides listed above may be reacted with any of the alcohols described.

The following examples are illustrative of various compositions falling within the scope of the invention. It will be understood that these are given only by way of example and are not to be construed as limitative of the invention in any manner. Thus, for example, different reaction products or mixtures of any two or more of them may be employed, different essential oils and different vitamin A and D concentrates of varying potency may be utilized, the proportions of materials may vary, and other changes may be made without departing from the spirit and teachings of the invention herein.

*Example I*

To 10 parts by weight of an irradiated ergosterol having 1,000,000 U. S. P. units of of vitamin D per gram there is added 300 parts by weight of a product comprising essentially the mono-oleyl ester of the acetic acid ester of citric acid. The resulting product is readily dispersible in aqueous media to form a uniform, homogeneous product.

*Example II*

A solution of 10 parts by weight of an irradiated ergosterol having 500,000 units of vitamin D per gram, dissolved in 1000 parts by weight of corn oil, is admixed with 220 parts by weight of a product comprising essentially the mono-lauryl ester of the di-acetic acid ester of tartaric acid. The resulting product is readily distributed into cream, milk, and fruit juices and can be substantially diluted with water without visibly affecting the homogeneity of the composition.

*Example III*

To 20 parts by weight of a sample of halibut liver oil fortified with irradiated ergosterol, so as to provide a product having 45,000 U. S. P. units of vitamin A per gram and 300,000 units of vitamin D per gram, there are added 170 parts by weight of a reaction product of mono-olein with the acetic acid ester of citric acid anhydride. The resulting product is readily dispersible in aqueous media such as milk to provide a uniform, homoeneous emulsion containing from 850 to 900 nits of vitamin A per liter.

Example IV

A composition is made up containing 50 parts by weight of irradiated ergosterol having a potency of 2,000,000 U. S. P. units of vitamin D per gram, 18 parts by weight of a concentrate of vitamins B and G prepared from brewer's yeast, parts by weight of calcium gluconate, and 325 parts by weight of a product comprising predominately the mono-oleyl ester of the di-acetic acid ester of tartaric acid anhydride. The resulting product is readily dispersible in aqueous media.

Example V

A composition is prepared containing 100 parts by weight of lemon oil and 10 parts by weight of the reaction product of mono-olein and the di-acetic acid ester of tartaric acid anhydride. The resulting composition is readily distributed or dispersed in aqueous media.

Example VI

A composition is prepared containing 100 parts by weight of orange oil and 8 parts by weight of the reaction product of di-olein and the acetic acid ester of citric acid anhydride. The composition dispersed well in aqueous media.

It will be understood, of course, that, in those instances where the chemical compounds or reaction products are employed in edible preparations or are to be taken internally, only those will be utilized which are definitely innocuous. Those skilled in the art will be able readily to select compounds or reaction products which are suitable for edible purposes in the light of my description herein.

The source of the vitamin concentrates or the like is, of course, immaterial. Thus, for example, there may be employed fish liver oils such as cod liver oil, salmon liver oil, halibut liver oil, or other oils, or concentrates prepared therefrom by extraction, saponification, molecular distillation, and other known treatment steps. Products such as carotene, ultra-violet ray irradiated ergosterol or derivatives of ergosterol, cathode-ray and electrodeless discharge activated products, and the like may also be utilized.

While, in the examples hereinabove, there has been disclosed the employment of vitamin concentrates having certain specified potencies, it is obvious that the invention is not so circumscribed. Thus, for example, vitamin concentrates may be utilized containing as high as 2,000,000 or more units of vitamin A per gram, diluted in oil, to which 10%, or more or less, of a chemical compound or reaction product of the type herein described may be added. Similarly, as indicated, mixtures of vitamins A and D of exceedingly high potency, preferably dissolved in an oil, may be mixed with about 10% to about 20% of such chemical compounds or reaction products and distributed in that form with directions for dilution with water, milk or other aqueous materials to provide for proper dosage.

As indicated in the above examples, the vitamin preparations may be supplemented by the addition thereto of sources or concentrates of water-soluble vitamins such as vitamins B and G, and also sources of assimilable calcium may be added to provide compositions having the necessary factors to supply certain dietary deficiencies. These and other variations are within the scope of the invention as pointed out in the appended claims.

The essential oils may also be selected from a large group and may be of natural or synthetic character. They may be distributed or sold in admixture with the chemical compound or reaction products described herein so that the composition may be dispersed in aqueous media or the like. Alternatively, the aqueous dispersions of such compositions may initially be prepared and sold or merchandised in such form.

The proportions of the chemical compounds utilized herein are subject to relatively wide variation. The selection of proportions depends upon the potency of the particular chemical compound utilized, the nature of the composition sought to be prepared, and the character of the results desired. In general, depending upon these factors, the proportions may range from a fraction of 1% to several percent. Those skilled in the art will readily be able to select proper proportions in the light of our teachings herein.

What we claim as new and desire to protect by Letters Patent of the United States is:

1. A composition which is adapted to disperse in aqueous media comprising an innocuous base ingredient and a proportion of a water-soluble to water-dispersible chemical compound comprising a reaction product of an anhydride of a carboxylic acid ester of a hydroxy polycarboxylic acid and a member selected from the group consisting of partial ethers and partial esters of aliphatic polyhydroxy substances.

2. An edible composition which is adapted to disperse in aqueous media comprising an edible oleaginous material and a proportion of a water-soluble to water-dispersible chemical compound containing at least one carboxyl group in its molecule and comprising a reaction product of a lowed molecular weight aliphatic carboxylic acid ester of an aliphatic hydroxy polycarboxylic acid anhydride and a member selected from the group consisting of higher molecular weight partial ethers and partial esters of aliphatic polyhydroxy substances.

3. A composition containing a member selected from the group consisting of provitamins and oil-soluble vitamin concentrates and a proportion of an innocuous water-soluble to water-dispersible chemical compound comprising a reaction product of an anhydride of a carboxylic acid ester of a hydroxy polycarboxylic acid and a member selected from the group consisting of partial ethers and partial esters of aliphatic polyhydroxy substances.

4. A composition containing an oil-soluble vitamin concentrate selected from the group consisting of vitamins A and D and mixtures thereof, and a proportion of a water-soluble to water-dispersible chemical compound comprising a reaction product of an anhydride of an acetic acid ester of an aliphatic hydroxy polycarboxylic acid and a member selected from the group consisting of higher molecular weight fatty acid partial esters of aliphatic polyhydroxy substances selected from the group consisting of glycerol, glycols, polyglycerols, polyglycols, sugars, sugar alcohols, and hydroxycarboxylic acids.

5. A composition containing a vitamin D concentrate and a proportion of a water-soluble to water-dispersible chemical compound corresponding to that resulting from the interaction of an acetic acid ester of an aliphatic hydroxy polycarboxylic acid anhydride with a higher molecular weight fatty acid monoglyceride, said composition having a potency of at least 100,000 U. S. P. units of vitamin D per gram.

6. A composition containing an oil-soluble vitamin concentrate selected from the group consisting of vitamins A and D and mixtures thereof, and a proportion of a water-soluble to water-dispersible chemical compound of normally liquid to pasty consistency corresponding to that resulting from the interaction of an acetic acid ester of an aliphatic hydroxy polycarboxylic acid anhydride with a higher molecular weight unsaturated fatty acid partial ester of an aliphatic polyhydroxy substance, said composition being distributed in an aqueous medium and containing at least 100,000 U. S. P units of vitamin D per gram.

7. A composition containing an irradiated provitamin D material, at least one water-soluble vitamin, a source of assimilable calcium, and a proportion of an innocuous water-soluble to water-dispersible chemical compound comprising a reaction product of an anhydride of a carboxylic acid ester of a hydroxy polycarboxylic acid and a member selected from the group consisting of partial ethers and partial ester of aliphatic polyhydroxy substances.

8. A composition containing an essential oil and a proportion of a water-soluble to water-dispersible chemical compound comprising a reaction product of an anhydride of a carboxylic acid ester of a hydroxy polycarboxylic acid and a member selected from the group consisting of partial ethers and partial esters of aliphatic polyhydroxy substances.

9. A composition containing a substantial proportion of an essential oil and a major proportion of a water-soluble to water-dispersible chemical compound of normally liquid to pasty consistency corresponding to that resulting from the interaction of an acetic acid ester of an aliphatic hydroxy polycarboxylic acid anhydride with a higher molecular weight unsaturated fatty acid partial ester of an aliphatic polyhydroxy substance, said composition being dispersible in aqueous media.

10. A composition containing a member selected from the group consisting of provitamins and oil-soluble vitamin concentrates and a proportion of an innocuous water-soluble to water-dispersible chemical compound having the general formula

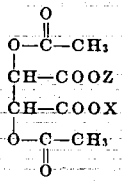

wherein Z is the radical of a member selected from the group consisting of higher molecular weight aliphatic partial ethers and partial esters of aliphatic polyhydroxy substances, and X is a cation.

11. A composition containing an oil-soluble vitamin concentrate selected from the group consisting of vitamins A and D and mixtures thereof, and a proportion of a water-soluble to water-dispersible chemical compound having the general formula

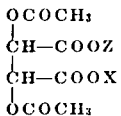

wherein Z is the radical of a member selected from the group consisting of partial ethers and partial esters of aliphatic polyhydroxy substances, and X is a cation.

12. A composition containing a vitamin D concentrate and a proportion of an innocuous water-soluble to water-dispersible chemical compound comprising an ester of an alcohol containing at least four carbon atoms with the acetic acid ester of citric acid, and salts thereof.

13. A composition containing a member selected from the group consisting of provitamins and oil-soluble vitamin concentrates and a proportion of an ester of oleic acid in accordance with the general formula

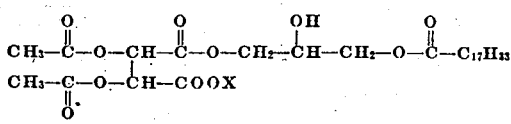

wherein X is a cation.

14. A composition which is adapted to disperse in aqueous media comprising an innocuous base ingredient and a proportion of a water-soluble to water-dispersible chemical compound of normally liquid to pasty consistency corresponding to that resulting from the interaction of an acetic acid ester of an aliphatic hydroxy polycarboxylic acid anhydride with a higher molecular weight unsaturated fatty acid partial ester of an aliphatic polyhydroxy substance.

15. An edible composition which is adapted to disperse in aqueous media comprising an edible oleaginous material and a proportion of an innocuous water-soluble to water-dispersible chemical compound comprising an ester of a lower molecular weight carboxylic acid ester of a hydroxy polycarboxylic acid with a compound selected from the group consisting of partial ethers and partial esters of aliphatic polyhydroxy substances.

16. A composition containing an essential oil and a proportion of an innocuous water-soluble to water-dispersible chemical compound corresponding to that resulting from the interaction of an acetic acid ester of an aliphatic hydroxy polycarboxylic acid anhydride with a higher molecular weight fatty acid monoglyceride.

17. An edible composition containing aqueous material, oleaginous material, and a proportion of an innocuous water-soluble to water-dispersible chemical compound containing at least one carboxyl group in its molecule and comprising a reaction product of a lower molecular weight aliphatic carboxylic acid ester of an aliphatic hydroxy polycarboxylic acid anhydride and a member selected from the group consisting of higher molecular weight partial ethers and partial esters of aliphatic polyhydroxy substances.

18. A composition containing an oil-soluble vitamin concentrate, oleaginous material, and a proportion of a water-soluble to water-dispersible chemical compound of normally liquid to pasty consistency corresponding to that resulting from the interaction of an acetic acid ester of an aliphatic hydroxy polycarboxylic acid anhydride with a higher molecular weight unsaturated faty acid partial ester of an aliphatic polyhydroxy substance.

19. A composition containing aqueous material, oleaginous material, a vitamin concentrate, and a proportion of a water-soluble to water-dispersible chemical compound of normally liquid to pasty consistency and comprising an ester of a lower molecular weight carboxylic acid ester of a hydroxy polycarboxylic acid with a compound selected from the group consisting of partial ethers and partial esters of glycerol.

20. A composition containing vitamin D concentrate and a proportion of a water-soluble to water-dispersible chemical compound comprising an innocuous ester of an alcohol containing at least four carbon atoms with the acetic acid ester of citric acid, and salts thereof.

21. A composition which is adapted to disperse in aqueous media comprising an innocuous base ingredient and a proportion of a water-soluble to water-dispersible chemical compound comprising an ester of a lower molecular weight carboxylic acid ester of a hydroxy polycarboxylic acid with an alcohol containing at least four carbon atoms.

22. A composition containing a member selected from the group consisting of provitamins and oil-soluble vitamin concentrates and a proportion of an innocuous water-soluble to water-dispersible chemical compound comprising an ester of a lower molecular weight carboxylic acid ester of a hydroxy polycarboxylic acid with an alcohol containing at least four carbon atoms.

23. A composition containing an essential oil and a proportion of a water-soluble to water-dispersible chemical compound comprising an ester of a lower molecular weight carboxylic acid ester of a hydroxy polycarboxylic acid with an alcohol containing at least four carbon atoms.

FRANK J. CAHN.
BENJAMIN R. HARRIS.